United States Patent [19]

Ioki et al.

[11] Patent Number: 5,586,152

[45] Date of Patent: Dec. 17, 1996

[54] CARBON FIBER-REINFORCED CARBON COMPOSITE MATERIALS, PROCESSES FOR THEIR PRODUCTION, AND FIRST WALLS OF NUCLEAR FUSION REACTORS EMPLOYING THEM

[75] Inventors: Kimihiro Ioki, Tokyo; Kohei Okuyama, Kagawa-ken; Kazuo Niwa, Kagawa-ken; Hitoshi Seki, Kagawa-ken, all of Japan

[73] Assignees: Mitsubishi Jukogyo Kabushiki Kaisha; Mitsubishi Chemical Corporation, both of Tokyo, Japan

[21] Appl. No.: 450,640

[22] Filed: May 25, 1995

Related U.S. Application Data

[60] Continuation of Ser. No. 286,184, Aug. 5, 1994, abandoned, which is a division of Ser. No. 873,683, Apr. 24, 1990, Pat. No. 5,390,217, which is a continuation of Ser. No. 343,374, Apr. 26, 1989, abandoned.

[30] Foreign Application Priority Data

| Apr. 28, 1988 | [JP] | Japan | 63-106154 |
| Apr. 28, 1988 | [JP] | Japan | 63-106157 |
| Apr. 28, 1988 | [JP] | Japan | 63-106158 |
| Sep. 7, 1988 | [JP] | Japan | 63-223787 |
| Sep. 9, 1988 | [JP] | Japan | 63-225817 |
| Sep. 9, 1988 | [JP] | Japan | 63-225818 |
| Sep. 9, 1988 | [JP] | Japan | 63-225819 |

[51] Int. Cl.$^6$ .............................. B32B 5/12; B32B 7/02
[52] U.S. Cl. .......................... 376/150; 428/113; 428/212; 428/408
[58] Field of Search .................. 60/271; 244/158 R; 376/136, 150; 428/113, 212, 244, 374, 408, 902

[56] References Cited

U.S. PATENT DOCUMENTS

| 3,819,468 | 6/1974 | Sauder et al. | 428/902 |
| 3,930,916 | 1/1976 | Shelley | 428/902 |
| 5,362,567 | 11/1994 | Washburn et al. | 428/408 |
| 5,390,217 | 2/1995 | Ioki et al. | 376/150 |
| 5,418,063 | 5/1995 | Booth | 428/408 |

FOREIGN PATENT DOCUMENTS

| 339606 | 11/1989 | European Pat. Off. . |
| 2546878 | 12/1984 | France . |

OTHER PUBLICATIONS

Database Inspec, AN 89–3479265 & Fusion Engineering and Design, vol. 9, pp. 295–300, 1989, Yoshitaka Gotoh, et al., "High Heat Load Tests of a Graphite Armor First Wall With a Water Cooling Jacket".

Kirk–Othmer, Encyclopedia of Chemical Technology, 3rd Edition, "Carbon (Carbon and Artifical Graphite)," 1978, vol. 4, pp. 622–631.

Rubin, L., "High–Modulus Carbon Fiber Based Carbon––Carbon for Space Applications," Report SD–TR–86–45, 18 Jul. 1986.

*Primary Examiner*—Michael J. Carone
*Attorney, Agent, or Firm*—Oblon, Spivak, McClelland, Maier & Neustadt, P. C.

[57] ABSTRACT

A carbon fiber-reinforced carbon composite material, wherein carbon fibers are oriented substantially in the thickness direction, the ratio of the thermal conductivity in the thickness direction to the thermal conductivity in a direction perpendicular to the thickness direction is at least 2, and the thermal conductivity in the thickness direction is at least 3 W/cm.° C.

4 Claims, 2 Drawing Sheets

5,586,152

CARBON FIBER-REINFORCED CARBON COMPOSITE MATERIALS, PROCESSES FOR THEIR PRODUCTION, AND FIRST WALLS OF NUCLEAR FUSION REACTORS EMPLOYING THEM

This application is a continuation of application Ser. No. 08/286,184, now abandoned, filed on Aug. 5, 1994, now abandoned, which is a division of application Ser. No. 07/873,683 filed Apr. 24, 1992, now U.S. Pat. No. 5,390, 217; which is a continuation of application Ser. No. 07/343, 374 filed Apr. 26, 1989, abandoned.

BACKGROUND OF THE INVENTION

1. Field of the Invention

The present invention relates to carbon fiber-reinforced carbon composite materials, processes for their production and first walls of nuclear fusion reactors made of such carbon composite materials.

2. Discussion of the Background

Carbon fiber-reinforced carbon composite materials (hereinafter referred to simply as C/C composite materials) are light in weight and highly strong and have a feature that they are excellent in the heat resistance and corrosion resistance. Therefore, they are used, for example, for aerospace materials such as rocket nozzles, nose cones or disk brakes of air planes, for heater elements, for hot pressing molds, for other mechanical parts, and for parts of nuclear reactors.

Such C/C composite materials are usually prepared by impregnating or mixing a matrix material such as a thermosetting resin such as a phenol resin or a furan resin, or a thermoplastic resin such as pitch, to long or short carbon fibers of e.g. polyacrylonitrile or pitch type, followed by heating and molding, then baking the molded product in a non-oxidizing atmosphere such as an inert gas atmosphere at a temperature of from 600° to 1,000° C., and further densifying the product by impregnating pitch or a resin thereto, followed by baking, or by a chemical vapor deposition method, or a combination of such methods, followed, if necessary, by graphitization.

However, the resulting C/C composite materials were not necessarily satisfactory when they were used for the purposes of conducting or removing heat in one direction i.e. in the thickness direction, and they had problems in their practical application.

For example, a first wall of a nuclear fusion reactor represents the entire structure in the nuclear fusion reactor, which is disposed to face the plasma, and includes e.g. limiters, diverters, blankets, and parts thereof. Such first wall is disposed close to the plasma and thus is under a severe environmental condition such that it is subjected to heat from plasma and bombernment of plasma particles. Particularly, the limiters and diverters receive high temperature loads, whereby the heat load conditions are particularly severe. As one of materials used for the first wall under such severe conditions, graphite may be mentioned. Graphite is an excellent low atomic number material from the viewpoint of plasma impurities and also has high thermal shock resistance.

FIG. 4 in the drawings illustrates the most typical conventional first wall wherein graphite is used. In the illustrated first wall, a graphite tile 11 is secured to a metal substrate 3 by means of a fixing plate 8 and a connector 9. When heat from the plasma enters the graphite tile 11 facing the plasma, the heat is conducted to the substrate by the contact thermal conduction and also dissipated by thermal radiation. In such system, the graphite tile 11 and the substrate 3 are in contact with each other merely by the mechanical connection, and the thermal conductivity at the contact portion is not adequate, and cooling tends to be inadequate when the heat load is high or lasts for a long period of time. The conventional first wall has the following problems.

When a high heat load (for example, 2 km/cm² for 3 seconds, or 4 km/cm² for at least one second) is exerted to the first wall, the surface temperature will be as high as at least about 2,800° C., and the vapor pressure of the graphite tile will be at least about $10^{-3}$ atm, whereby the loss in thickness by sublimation from the surface of the graphite tile will be as large as about a few tends μm/sec. As a result, inclusion of carbon atoms in the plasma increases, which brings about a problem that the control of plasma impurities will be thereby seriously adversely affected. Further, the loss of the graphite surface is substantial, whereby there is a problem that the useful life of the first wall is short.

In conventional nuclear fusion reactors, it is rare that such high heat load is exerted to the first wall, and the conventional first wall may sufficiently provide its function against the above-mentioned problems. However, in order to further improve the level of safety, or for a future nuclear fusion reactor for which it is expected that a heat load higher than ever will be exerted to the first wall constantly over a long period of time, it is desired to develop a first wall having the above problems adequately solved.

Under these circumstances, the present inventors have conducted various studies to overcome the above-mentioned drawbacks and to obtain a C/C composite material useful for the above-mentioned first wall or the like, and have finally arrived at the present invention.

SUMMARY OF THE INVENTION

The present invention provides:
1. A carbon fiber-reinforced carbon composite material, wherein carbon fibers are oriented substantially in the thickness direction, the ratio of the thermal conductivity in the thickness direction to the thermal conductivity in a direction perpendicular to the thickness direction is at least 2, and the thermal conductivity in the thickness direction is at least 3 w/cm.° C.
2. A process for producing a carbon fiber-reinforced carbon composite material, which comprises impregnating long carbon fibers with a thermosetting resin, followed by heating to obtain a fiber/resin composite, cutting the fiber/resin composite into pieces having a length longer than the thickness of the desired composite material, aligning the composite pieces in one direction substantially in parallel to one another, exerting a pressure to the aligned composite pieces in a direction perpendicular to the longitudinal direction of the fibers, molding them to cure the resin, followed by carbonization, and impregnating the carbonized product with pitch or with a thermosetting resin, followed by carbonization and, if necessary, by graphitization.
3. A carbon fiber-reinforced carbon composite material having a metal bonded thereto, wherein:
   (i) the carbon composite material comprises carbon fibers which are oriented substantially in the thickness direction, wherein the ratio of the thermal conductivity in the thickness direction to the thermal conductivity in a direction perpendicular to the thickness direction is at least 2, and the thermal conductivity in the thickness direction is at least 3 W/cm.° C., and (ii) the metal is bonded to one side of the carbon composite material which is substantially perpendicular to the thickness direction of the carbon composite material.

4. A method for producing a carbon fiber-reinforced carbon composite material having a metal bonded thereto, which comprises impregnating long carbon fibers with a thermosetting resin, followed by heating to obtain a fiber-resin composite, cutting the fiber/resin composite into pieces having a length longer than the thickness of the desired composite material, aligning the composite pieces in one direction substantially in parallel to one another, exerting a pressure to the aligned composite pieces in a direction perpendicular to the longitudinal direction of the fibers, molding them to cure the resin, followed by carbonization, impregnating the carbonized product with pitch or with a thermosetting resin, followed by carbonization and, if necessary, by graphitization, to obtain a carbon fiber-reinforced carbon composite material, and then bonding a metal to one side of the carbon composite material which is substantially perpendicular to the thickness direction of the carbon composite material.

5. A first wall of a nuclear fusion reactor to be disposed to face a plasma of the nuclear fusion reactor, which is composed essentially of a carbon fiber-reinforced carbon composite material wherein carbon fibers are oriented substantially in the thickness direction, the ratio of the thermal conductivity in the thickness direction to the thermal conductivity in a direction perpendicular to the thickness direction is at least 2, and the thermal conductivity in the thickness direction is at least 3 W/cm.° C., and which is to be disposed so that one side which is substantially perpendicular to the thickness direction, faces the plasma.

6. A carbon fiber-reinforced carbon composite material, wherein at least about 50% of carbon fibers are oriented substantially in the thickness direction, the ratio of the thermal conductivity in the thickness direction to the thermal conductivity in a direction perpendicular to the thickness direction and to the plane of orientation of the fibers in the thickness direction is at least 1.2, and the thermal conductivity in the thickness direction is at least 1.5 W/cm.° C.

7. A process for producing a carbon fiber-reinforced carbon composite material, which comprises impregnating a woven fabric of carbon fiber with a thermosetting resin to obtain a fiber/resin composite, cutting the fiber/resin composite into pieces having a desired size, overlaying the composite pieces one on another so that the plane of each woven fabric is in the thickness direction, followed by molding, curing and carbonization, and impregnating the carbonized product with pitch or with a thermosetting resin, followed by carbonization and, if necessary, graphitization.

8. A process for producing a carbon fiber-reinforced carbon composite material, which comprises overlaying woven fabrics of carbon fiber impregnated with a thermosetting resin one on another, followed by molding, curing and carbonization, and impregnating the carbonized product with pitch or with a thermosetting resin, followed by carbonization and, if necessary, graphitization to obtain a carbon fiber-reinforced carbon composite material, cutting the carbon composite material into pieces having a desired size, overlaying the pieces one on another so that the plane of each woven fabric is in the thickness direction and binding or bonding them integrally.

9. A process for producing a carbon fiber-reinforced carbon composite material, which comprises fibrillating short carbon fibers to form webs, overlaying webs one on another so that the plane of each web is in the thickness direction, impregnating the webs with pitch or with a thermosetting resin before or after the overlaying, followed by molding, curing and carbonization, and impregnating the carbonized product with pitch or with a thermosetting resin, followed by carbonization and, if necessary, graphitization.

10. A process for producing a carbon fiber-reinforced carbon composite material, which comprises fibrillating short carbon fibers to form webs, needling the webs in the thickness direction to obtain felts, overlaying the felts one on another so that the plane of each felt is in the thickness direction of the desired carbon composite material, impregnating the felts with pitch or with thermosetting resin before or after the overlaying, followed by molding, curing and carbonization, and impregnating the carbonized product with pitch or with a thermosetting resin, followed by carbonization and, if necessary, graphitization.

11. A carbon fiber-reinforced carbon composite material obtained by the method of the above 9 or 10, wherein the thermal conductivity in the thickness direction and the thermal conductivity in a direction perpendicular to the thickness direction and parallel to the plane of each web or felt, are at least 3 W/cm.° C.

12. A first wall of a nuclear fusion reactor to be disposed to face a plasma of the nuclear fusion reactor, which is composed essentially of a carbon fiber-reinforced carbon composite material wherein at least 50% of carbon fibers are oriented substantially in the thickness direction, the ratio of the thermal conductivity in the thickness direction to the thermal conductivity in a direction perpendicular to the thickness direction and to the plane of orientation of the fibers in the thickness direction, is at least 1.2, and the thermal conductivity in the thickness direction is at least 1.5 W/cm.° C., and which is to be disposed so that one side which is substantially perpendicular to the thickness direction, faces the plasma.

13. A first wall of a nuclear fusion reactor to be disposed to face a plasma of the nuclear fusion reactor, which is composed essentially of a carbon fiber-reinforced carbon composite material obtained by the method of the above 9 or 10, wherein the thermal conductivity in the thickness direction and the thermal conductivity of a direction perpendicular to the thickness direction and parallel to the plane of each web or felt, are at least 3 W/cm.° C., and which is to be disposed so that one side which is substantially perpendicular to the thickness direction, faces the plasma.

BRIEF DESCRIPTION OF THE DRAWINGS

In the accompanying drawings.

DETAILED DESCRIPTION OF THE PREFERRED EMBODIMENTS

Figure 1:
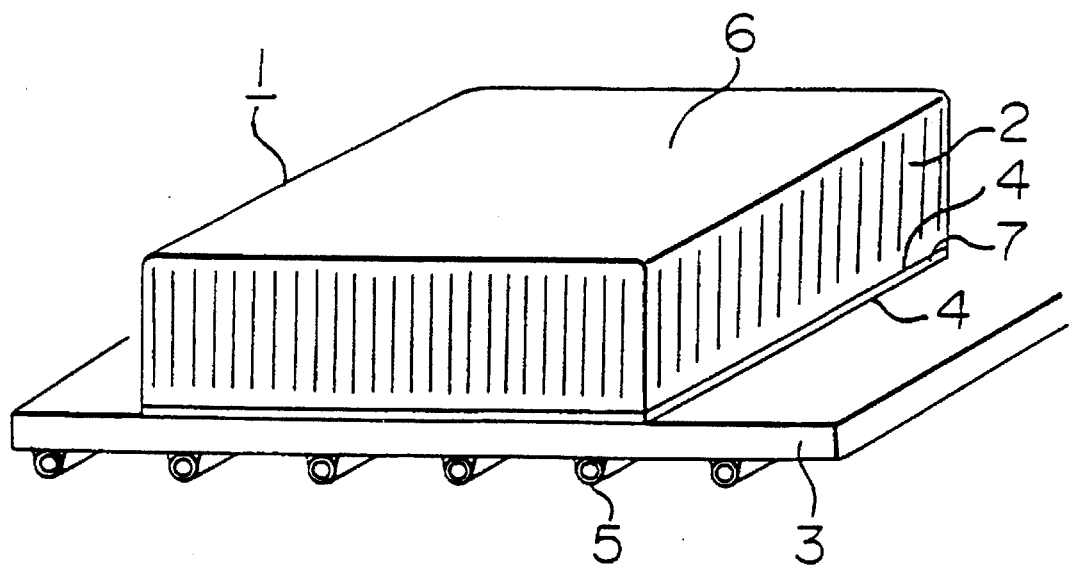
FIGS. 1 to 3 are perspective views illustrating the first to third embodiments of the first wall of the present invention.

Now, the present invention will be described in detail.

The carbon fibers useful for the present invention may be of any type, such as polyacrylonitrile (PAN) type or pitch type carbon fibers or carbon fibers prepared by a gas phase growing method. However, high performance pitch-type carbon fibers having high thermal conductivity in the axial direction of fibers, are particularly preferred.

The C/C composite materials of the present invention are obtainable by using such carbon fibers.

(I) In a case where carbon fibers are oriented substantially in the thickness direction, the ratio of the thermal conductivity in the thickness direction to the thermal conductivity in a direction perpendicular to the thickness direction is at least 2, and the thermal conductivity in the thickness direction is at least 3 W/cm.° C., such C/C composite material can be prepared by the following method.

Firstly, long carbon fibers are impregnated with a thermosetting resin, followed by heating to partially cure the thermosetting resin.

Such thermosetting resin includes, for example, a phenol resin, a furan resin, an epoxy resin and an unsaturated polyester resin. A phenol resin, particularly a resol-type phenol resin, is preferred. Such thermosetting resin is used usually as dissolved and diluted with a solvent, for example, an alcohol such as ethanol, a hydrocarbon such as hexane, or acetone.

The concentration of the thermosetting resin solution is usually within a range of from 10 to 70% by weight, preferably from 20 to 60% by weight.

When a curing agent is required as in the case of a furan resin or an epoxy resin, such curing agent is also added to the solution. Such curing agent is added in an amount suitable for the particular resin used.

As a method for impregnating long carbon fibers to such thermosetting resin solution, a simple method of dipping the carbon fibers in the solution, may be employed. However, in the case of a long fiber robing, a method of continuously passing it through a tank filled with the solution, is preferred from the viewpoint of the efficiency of the treatment. Further, in this case, it is preferred to apply supersonic waves of a level of from 10 to 50 KHz to the tank filled with the solution, whereby an adverse effect of irregular treatment due to e.g. air bubbles among monofilaments or among weave openings, can be prevented. The carbon fibers impregnated with the thermosetting resin solution is, for instance, passed through rollers to remove an excess solution and then subjected to heat treatment.

By the heat treatment, the thermosetting resin is thermally cured. The conditions for the heat treatment vary depending upon the type of the thermosetting resin used. However, the heat treatment is conducted usually at a temperature of from 50° to 300° C., preferably from 80° to 200° C. for from 0.2 to 5 hours, preferably from 0.2 to 2 hours. In such a case, it is preferred to gradually raise the temperature to the prescribed temperature in order to avoid abrupt release of the solvent from the thermosetting resin solution coated on the carbon fibers. The heat treatment is preferably conducted by continuously passing the carbon fibers through a heating furnace, from the viewpoint of the efficiency of the treatment.

Then, the obtained fiber/resin composite is cut into pieces having a length longer than the thickness of the desired C/C composite material.

The length is selected usually within a range slightly longer than the thickness of the desired product and may, for example, be selected within a range of from 15 to 100 mm. The composite pieces are then aligned in one direction so that they will be substantially parallel to one another. Then, a pressure is exerted to the aligned pieces in a direction perpendicular to the longitudinal direction of the fibers, followed by heating and molding.

For example, by supplying the composite pieces to a mold by means of a funnel-form leader, the composite pieces are aligned substantially in parallel to one another in the mold, then a pressure is exerted in a direction perpendicular to the longitudinal direction of the fibers under heating at a temperature required for the curing of the resin, to cure the resin and obtain a molded product.

Then, the molded product is introduced into a container so that it is surrounded by coke breeze. Then, the container is introduced into an electric furnace, and the temperature is raised to a level of 100° C., if necessary, under a nitrogen gas stream, for carbonization.

If necessary, the carbonized product is introduced into a graphitization furnace and subjected to heat treatment at a temperature of at least 2,000° C. under an inert atmosphere.

Then, obtained carbonized product or graphitized product is impregnated with a petroleum-type or coal-type pitch or with a thermosetting resin such as a phenol resin or a furan resin, followed by carbonization, after curing the resin in the case where the thermosetting resin is employed.

In such case, the thermosetting resin is used usually as dissolved in a solvent such as an alcohol, acetone or anthracene oil to have a proper viscosity.

Further, in such case, it is preferred to employ an impregnation method under pressure.

For example, a molded carbonized or graphitized product and pitch are introduced into a low pressure reactor (autoclave), which is then heated under vacuum to dissolve the pitch. After the carbonized or graphitized product is immersed in the molten pitch, nitrogen gas is introduced, and the temperature is raised under a low pressure to a level of from 550° to 600° C.

Then, the reactor is cooled, and the densified product of the carbonized or graphitized product is withdrawn, and it is carbonized at a temperature of up to 100° C. in the same manner as described above and, if necessary, graphitized.

The above-mentioned so-called densification is repeated to obtain a high density C/C composite material having a specific gravity of at least 1.6.

If the densification or the resin content in the fiber/resin composite is inadequate, or if the temperature raising rate for carbonization or graphitization is too high, the strength of the fibers in a direction perpendicular to the longitudinal direction of the fibers, tends to be low. In some cases, the fibers are likely to break. Therefore, it is necessary to select proper conditions.

The C/C composite material thus obtained is an anisotropic material having high heat conductivity and electrical conductivity in the direction of the thickness. In order to improve the strength in a direction perpendicular to the thickness direction, the obtained C/C composite material may be wound by long carbon fibers or by a carbon material such as a C/C composite material, depending upon the particular purpose. Further, a plurality of composite materials may be bonded by means of e.g. a resin composed essentially of a phenol resin, and the bonded product is again heated to a temperature range at which the C/C composite materials were finally treated, to firmly bond the plurality of pieces of the C/C composite materials to obtain a composite material having a desired size.

In the present invention, this C/C composite material may be reinforced in both the thickness direction and the direction perpendicular thereto, by bonding a metal to one side of the C/C composite material, which is substantially perpendicular to the thickness direction of the composite material.

Various metals may be employed depending upon the particular purposes of application of the resulting C/C composite materials. However, it is usual to select the metal from, for example, Ti, Cu, Fe, Ni, Cr and alloys thereof. When heat resistance is required, Ti or an alloy of Ti is preferred. For example, in the case of Ti, such an alloy preferably contains Al or V. Such metal is employed usually in the form of a thin plate having a thickness of at most about 5 mm, preferably from 0.1 to 1 mm. The bonding may be conducted by a usual method such as vacuum soldering, diffusion bonding or HIP (hot isostastic press).

(II) In a case where at least 50% of carbon fibers are oriented substantially in the thickness direction, the ratio of the thermal conductivity in the thickness direction to the thermal conductivity in a direction perpendicular to the thickness direction and to the plane of orientation of the fibers in the thickness direction, is at least 1.2, preferably at least 1.5, and the thermal conductivity in the thickness direction is at least 1.5 W/cm.° C., preferably at least 1.8 W/cm.° C., such C/C composite material can be obtained by the following method using woven fabrics, short fibers, webs or non-woven fabrics.

(A) A case where woven fabric is used:

As the woven fabric, a plain weave fabric, a satin fabric or a twill fabric may be employed.

Firstly, such woven fabric is impregnated with a thermosetting resin.

The type and the concentration of the thermosetting resin may be selected in the same manner as described above with respect to (I).

The method of impregnating the woven fabric of carbon fibers to such thermosetting resin solution may also be the same as described above with respect to (I).

After the impregnation, the woven fabric is dried in a drier to remove the solvent. The fiber/resin composite thus obtained, is then cut into pieces having a desired size.

For example, the woven fabric is passed through rolls to impregnate an alcohol solution of a phenol resin, and the impregnated fabric is then passed through rolls to remove an excess resin and then introduced in a drier kept at a temperature lower by 10° C. than the boiling point of the alcohol to remove the alcohol. Then, the fabric is cut by a cutter into pieces having a size slightly larger than the cross section in the thickness direction of the desired product.

The cut pieces of the composite are overlayed one on another in a mold frame having a size slightly larger than the desired product, to fill the mold, and molded. For example, the cut pieces of the composite are piled one on another, and a pressure is exerted in the direction of piling, and the temperature is raised for molding and curing the resin to obtain a molded product.

The conditions for the heat curing treatment vary depending upon the type of the thermosetting resin used. Usually, however, the heat treatment is conducted at a temperature of from 50° to 300° C. preferably from 80° to 200° C. for from 0.2 to 5 hours, preferably from 0.2 to 2 hours.

Then, the molded product is introduced into a container, followed by carbonization and, if necessary, graphitization, in the same manner as in the case of the above-mentioned (I).

Then, by repeating the so-called densification in the same manner as in the case of the above (I), a high density C/C composite material having a specific gravity of at least 1.6 can be obtained.

The C/C composite material thus obtained is an anisotropic material having a thermal conductivity of at least 1.5 W/cm.° C. (usually less than 3.0 W/cm.° C.) and excellent electrical conductivity, in the thickness direction.

(B) Another embodiment in which woven fabric is used:

Woven fabrics of carbon fibers impregnated with a thermosetting resin were overlayed one on another, followed by molding, curing and carbonization, and the carbonized product is impregnated with pitch or a thermosetting resin, followed by carbonization and, if necessary, graphitization, to obtain the desired C/C composite material.

This material is then cut into pieces having a size, in the plane of the woven fabric of this C/C composite material, larger than the cross section in the thickness direction of the desired product.

The cut pieces of the composite material are bound or bonded in such a form wherein the plane direction agrees i.e. the plane of each woven fabric is in the thickness direction of the desired product.

They may be bound by winding long fibers made of carbon fibers thereon. Otherwise, they may be bound by a C/C composite material or a usual carbon material, so that there will be no space between the overlayed pieces.

Further, the pieces may be bonded by means of e.g. a resin composed essentially of a phenol resin, and they are heated to a temperature level at which the C/C composite material was finally treated, to bond the plurality of the cut pieces of the C/C composite material to one another.

(C) A case where short fibers or non-woven fabric is used:

(i) Short carbon fibers are fibrillated to form a web by a conventional method. This web is used instead of the woven fabric of (A) and treated in the same manner as in (A) to obtain a C/C composite material wherein the direction of the majority of fibers of the web (the direction of the plane of the web) is in the same direction as the thickness direction of the desired product.

(ii) A non-woven fabric of carbon fiber prepared from long carbon fibers by a usual method is used instead of the woven fabric of (A) and treated in the same manner as in (A) to obtain a C/C composite material wherein the direction of the plane of the non-woven fabric is in the same direction as the thickness direction of the desired product.

(D) A case where a web formed from short fibers and subjected to needling is used:

A product obtained by needling the web obtained in (C) in the thickness direction of the web, is used instead of the web, and it is treated in the same manner as in (C) to obtain a C/C composite material wherein the direction of the plane of the web is in the same direction as the thickness direction of the desired C/C composite material.

Further, in the present invention, in the above method (C) (i) or (D) (preferably (D)), it is possible to obtain a product wherein the thermal conductivity in the thickness direction and the thermal conductivity in a direction perpendicular to the thickness direction and parallel to the plane of each web or felt, are at least 3 W/cm.° C., by increasing the number of densification operation (at least about 6 or 7 times) or needling operation, or by conducting graphitization at a relatively high temperature (at least about 2,900° C.)) for applications wherein heat is effectively conducted in two directions i.e. in the thickness direction and one direction perpendicular to the thickness direction.

In the present invention, such C/C composite material is used as the main constituting material for the first wall to be disposed to face a plasma of a nuclear fusion reactor, and it is disposed so that one side which is substantially perpendicular to the thickness direction, faces the plasma. The C/C composite material is positioned to extend, in its thickness direction between the high temperature plasma region and the external low temperature region.

Further, in the present invention, it is preferred to bond or bind, by metallurgical bonding or by mechanical binding, a metal to one side of the C/C composite material which is substantially perpendicular to the thickness direction of the C/C composite material. Particularly preferred is the metallurgically bonding. The metal is usually selected from, for example, Ti, Cu, Fe, Ni, Mo, Cr and alloys thereof. As an alloy system, for example in the case of Ti, it is preferred that the alloy contains Al or V.

Such metal is used usually in the form of a thin plate having a thickness of at most about 5 mm, preferably from 0.1 to 0.3 mm. However, a stainless steel plate having a thickness of not more than about 50 mm, may be employed as the substrate directly or with inter-position of the above thin plate. The bonding may be made by a conventional method such as vacuum soldering, diffusion bonding or HIP (hot isotactic press).

The C/C composite material of the present invention has high heat conductivity and electrical conductivity in at least one direction including the thickness direction and thus is capable of effectively removing or conducting heat. Further, when a metal is bonded as mentioned above, the thermal shock resistance in both the thickness direction and the direction perpendicular thereto is high.

Now, the present invention will be described in further detail with reference to Examples. However, it should be understood that the present invention is by no means restricted to such specific Examples.

EXAMPLE 1

Long fibers of pitch-originated carbon fiber ("Dialead" manufactured by Mitsubishi Kasei Corporation, 4,000 filaments, fiber diameter: 10 μm) were immersed in an ethanol solution of a phenol resin, and then they were introduced into a drier to remove ethanol at 70° C. and then heated to a temperature of at least 100° C. to half-cure the phenol resin. The fiber/resin composite thus obtained (tow prepreg) (carbon fiber/resin=56/44 in weight ratio) was cut into pieces having a length of 40 mm. The pieces were rod-like and rigid with the fibers fixed with the resin. The cut pieces of the composite were aligned in one direction in a mold so that they were in parallel to one another, so as to fill the mold in the form larger than the size of the desired C/C composite material. Then, a low pressure is exerted at 150° C., and the temperature was raised to 250° C. over a period of one hour and held at 250° C. for one hour for molding and curing.

The size after the molding was 101.9×102.5×40.1 mm.

Then, this molded product was introduced into a container packed with coke breeze and heated to 1,000° C. over a period of about 50 hours in a state covered with the coke breeze, for carbonization of the resin.

Then, this carbonized composite and solid pitch were introduced into an autoclave, and the temperature was raised to 250° C. under a reduced pressure condition. Then, nitrogen was permitted to bring the atmosphere to a positive pressure. Then, the temperature was raised to 500° C. in 8 hours and then held at 500° C. for 5 hours.

The pressure during the temperature raising, was maintained at a constant level by adjusting the valve attached to the autoclave.

The autoclave was cooled, and the composite material was taken out and carbonized to a temperature of 1,000° C. in the same manner as the carbonization of the molded product. The above autoclave treatment and the subsequent carbonization treatment were repeated in a total of three times. Then, the product was introduced into a graphitization furnace and heated to 2,800° C. in an argon atmosphere and then cooled to obtain a C/C composite material. The C/C composite material thus obtained had a bulk density of 1.8 g/cm$^3$, and the thermal conductivities in the thickness direction (the same direction as the fiber axis) and in a direction perpendicular thereto, were measured by a laser flash method thermal coefficient measuring device (manufactured by Shinkuriko).

The thermal conductivity in the thickness direction was 3.70 W/cm.° C., and the thermal conductivity in the direction perpendicular to the thickness direction was 0.31 W/cm.° C. The ratio was 12.0.

This product did not break even when rapidly introduced into the graphitization furnace heated at a temperature of 2,500° C., and was superior also in the thermal shock resistance.

EXAMPLE 2

A C/C composite material was prepared in the same manner as in Example 1 except that the size after the molding was 122×137×44 mm, and the autoclave treatment and the subsequent carbonization treatment were repeated in a total of 4 times.

The bulk density of the C/C composite material thus obtained, was 1.83 g/cm$^3$. The thermal conductivity in the thickness direction was 3.61, and the thermal conductivity in the direction perpendicular to the thickness direction was 0.51. The ratio was 7.08.

This C/C composite material did not break even when rapidly introduced into a graphitization furnace heated at a temperature of 2,500° C. and it was excellent also in the thermal shock resistance.

EXAMPLE 3

Eight satin fabric sheets (260 g/m$^2$) of pitch fibers ("Dialead", 3,000 filaments, fiber diameter: 10 μm) were impregnated in an ethanol solution of a phenol resin (phenol resin/ethanol=¼) and then introduced into a drier maintained at a temperature of 70° C. to remove ethanol. Then, the obtained composite was cut into pieces of 22×105 mm. The pieces of the composite were overlayed one on another in a thickness of about 95 mm in a direction perpendicular to the plane of 22×105 mm to obtain a size larger than the size of the desired C/C composite material.

Then, a low pressure was exerted at 150° C., and the temperature was raised to 250° C. over a period of one hour, and maintained at 250° C. for one hour for molding and curing. The size of the molded product thus obtained was 103.2×93.4×21.9 mm.

Then, this molded product was introduced into a container packed with coke breeze and heated to 1,000° C. over a period of about 50 hours in a state covered with coke breeze, for carbonization. Then, the carbonized composite material and solid pitch were introduced into an autoclave, and the temperature was raised to 250° C. under a reduced pressure condition. Then, nitrogen gas was introduced to bring the atmosphere in a positive pressure, and the temperature was raised to 500° C. over a period of 8 hours and then maintained at 500° C. for 5 hours.

The pressure during the temperature raise, was maintained at a constant level by means of a valve attached to the autoclave.

The autoclave was cooled, and the composite material was taken out and carbonized to a temperature of 1,000° C. in the same manner as in carbonization of the molded product. The above-mentioned autoclave treatment and the subsequent carbonization treatment were conducted in a total number of three times, and the product was introduced into a graphitization furnace and heated to a temperature of 2,800° C. in an argon atmosphere and then cooled to obtain a C/C composite material.

The bulk density of the C/C composite material thus obtained was 1.62 g/cm$^3$. The thermal conductivity in the thickness direction was 1.63 W/cm.° C., and the thermal conductivity in a direction perpendicular thereto and perpendicular to the plane of the woven fabric, was 0.23 W/cm.° C. The ratio of the thermal conductivities was 7.0. (The orientation in the thickness direction of the carbon fibers was about 50%.)

EXAMPLE 4

The same satin fabric of pitch-originated carbon fibers as used in Example 3 was impregnated in an ethanol solution of a phenol resin in the same manner as in Example 3, dried, molded into a flat plate and cured. Then, this product was heated at 1,000° C., and then usual pitch impregnation method was repeated to densify the product. Finally, graphitization was conducted at 2,800° C. Then, this flat plate C/C composite material having a thickness of 10 mm was cut into pieces having a width of 20 mm and a length of 100 mm. Twenty pieces thus obtained were overlayed one on another so that their flat surfaces were in contact one another, and they were bonded by a phenol resin. Further, they were wound by carbon fibers to obtain C/C composite material having a width of 100 mm, a length of 200 mm and a thickness of 20 mm. The thermal conductivity in the thickness direction of this product was 1.64 W/cm.° C., and the ratio of the thermal conductivity in the thickness direction to the thermal conductivity in a direction perpendicular to the thickness direction and perpendicular to the bonding surfaces, was 7.5. (The orientation in the thickness direction was about 50%.)

EXAMPLE 5

Pitch-originated fibers ("Dialead", 3,000 filaments, fiber diameter: 10 μm) were cut to obtain short fibers, which were then fibrillated to obtain a web. The web was cut into pieces of 30 mm×150 mm. The pieces were impregnated in an ethanol solution of a phenol resin. Then, these pieces were overlayed one on another to obtain a thickness of about 100 mm, and a C/C composite material was prepared in the same manner as in Example 3.

The thermal conductivity in the thickness direction of the C/C composite material thus obtained was 1.64. The ratio of the thermal conductivity in the thickness direction to the thermal conductivity in a direction perpendicular to the thickness direction and parallel to the laminating direction, was about 6.5. (The orientation of the plane of webs in the thickness direction was about 100%.)

EXAMPLE 6

The same web as obtained in Example 5 was subjected to needling, to obtain a felt in which fibers were oriented in the thickness direction of the web.

By using this felt, a C/C composite material was obtained in the same manner as in Example 5, and the thermal conductivity was measured in the same manner as in Example 5. The thermal conductivity in the thickness direction was 1.64, and the ratio was 6.0. (The orientation of the plane of webs in the thickness direction was about 93%.)

EXAMPLE 7

A C/C composite material was prepared in the same manner as in Example 3 except that since the desired size for the C/C composite material was large, the composite was cut into pieces having a size of 45×110 mm, and the size of the molded product obtained by overlaying to increase the carbon fiber content in the finally obtainable C/C composite material, was changed to 112×105×46 mm, and the autoclave treatment and the subsequent carbonization treatment were conducted four times in total.

The bulk density of the composite material thus obtained was 1.82 g/cm$^3$. The thermal conductivity in the thickness direction was 2.14 W/cm.° C., and the thermal conductivity in a direction perpendicular to the thickness direction and to the plane of each woven fabric, was 0.34 W/cm.° C. The ratio of the thermal conductivities was 6.0. (The orientation of the carbon fibers in the thickness direction was about 50%.)

EXAMPLE 8

A C/C composite material was prepared in the same manner as in Example 7 except that the temperature for heat treatment was changed to 3,000° C. in Example 7.

The bulk density of the composite material thus obtained was 1.84 g/cm$^3$. The thermal conductivity in the thickness direction was 2.95 W/cm.° C., and the thermal conductivity in a direction perpendicular to the thickness direction and to the plane of each woven fabric, was 0.37 W/cm.° C. The ratio of the thermal conductivities was about 8.0.

EXAMPLE 9

A C/C composite material was obtained in the same manner as in Example 5 except that in Example 5, the thickness of lamination was increased to increase the carbon fiber content in the finally obtainable C/C composite material.

The bulk density of the composite material was 1.85 g/cm$^3$. The thermal conductivity in the thickness direction was 1.72 W/cm.° C., and its ratio to the thermal conductivity (0.39) in a direction perpendicular to the thickness direction and to the bonding surface, was about 4.4.

EXAMPLE 10

A C/C composite material was obtained in the same manner as in Example 9 except that in Example 9, the temperature for heat treatment was changed to 3,000° C.

The bulk density of the composite material thus obtained was 1.83 g/cm$^3$, and the ratio of the heat conductivities was about 4.9 (2.19/0.45).

EXAMPLE 11

A C/C composite material was prepared in the same manner as in Example 6 except than in Example 6, the number of needling was increased to increase the proportion of fibers oriented in the thickness direction of the webs, and the autoclave treatment and the subsequent carbonization treatment were conducted five times in total.

The bulk density of the composite material thus obtained was 1.72 g/cm³. The thermal conductivity in the thickness direction was 1.66, and its ratio to the thermal conductivity (1.17) in a direction perpendicular to the thickness direction and to the direction of lamination was about 1.4.

EXAMPLE 12

A C/C composite material was prepared in the same manner as in Example 11 except that in Example 11, the temperature for heat treatment was changed to at least about 2,900° C.

The bulk density of the composite material thus obtained was 1.73 g/cm³, and the ratio of the heat conductivities was about 1.2 (1.84/1.53).

EXAMPLE 13

A C/C composite material was prepared in the same manner as in Example 6 except that in Example 6, the densification treatment was conducted 8 times, and the temperature of graphitization was changed to at least about 2,900° C.

The thermal conductivity in the thickness direction and the thermal conductivity in a direction perpendicular to the thickness direction and to the direction of lamination, were 3.3 W/cm.° C. and 3.1 W/cm.° C., respectively. Further, the thermal conductivity in a direction perpendicular to the thickness direction and parallel to the direction of lamination, was 0.57 W/cm.° C.

EXAMPLE 14

By using the C/C composite material obtained in Example 1, a pure Ti plate was bonded to one side of the composite material which is substantially perpendicular to the thickness direction of the composite material.

Namely, on a pure Ti plate (melting point: about 1,675° C.) having a thickness of about 0.3 mm, a Cu solder was placed, and the above C/C composite material was placed thereon. Then, a weight of about 1 kg was placed thereon. In a vacuum furnace, the temperature was raised over a period of about one hour and maintained at about 1,050° C. for 5 hours to obtain a desired C/C composite material having Ti bonded thereto.

The obtained C/C composite material had adequate reinforcing effects also in a direction perpendicular to the thickness direction.

EXAMPLE 15

A C/C composite material was prepared in the same manner as in Example 14 except that in Example 14, the size after the molding was 122×137×44 mm and the autoclave treatment and the subsequent carbonization treatment were conducted four times in total.

The bulk density of the C/C composite material thus obtained was 1.83 g/cm³. The thermal conductivity in the thickness direction was 3.61, and the thermal conductivity in the direction perpendicular to the thickness direction was 0.51. The ratio of the thermal conductivities was 7.08.

This C/C composite material did not break even when introduced rapidly into a graphitization furnace heated to a temperature of 2,500° C., and it was excellent in the thermal shock resistance.

Then, a pure Ti plate was bonded to one side of this C/C composite material in the same manner as in Example 14. The C/C composite material thus obtained had adequate reinforcing effects also in a direction perpendicular to the thickness direction.

EXAMPLE 16

FIG. 1 illustrates a first embodiment of the first wall of a nuclear fusion reactor according to the present invention. The first wall 1 comprises the C/C composite material 2 prepared in Example 1, which is vacuum-soldered to a substrate 3.

Namely, the composite material 2 is bonded to a stainless steel substrate 3 having a thickness of 10 mm by a copper solder with interposition of a Ti plate 7 having a thickness of 1 mm and a solder portion 4.

The substrate 3 is provided with cooling tubes 5 to improve the cooling effects.

In this Figure, the plasma-facing side 6 is disposed to face the plasma of the nuclear fusion reactor. In this manner, the composite material of the present invention is used as the first wall.

Figure 2:
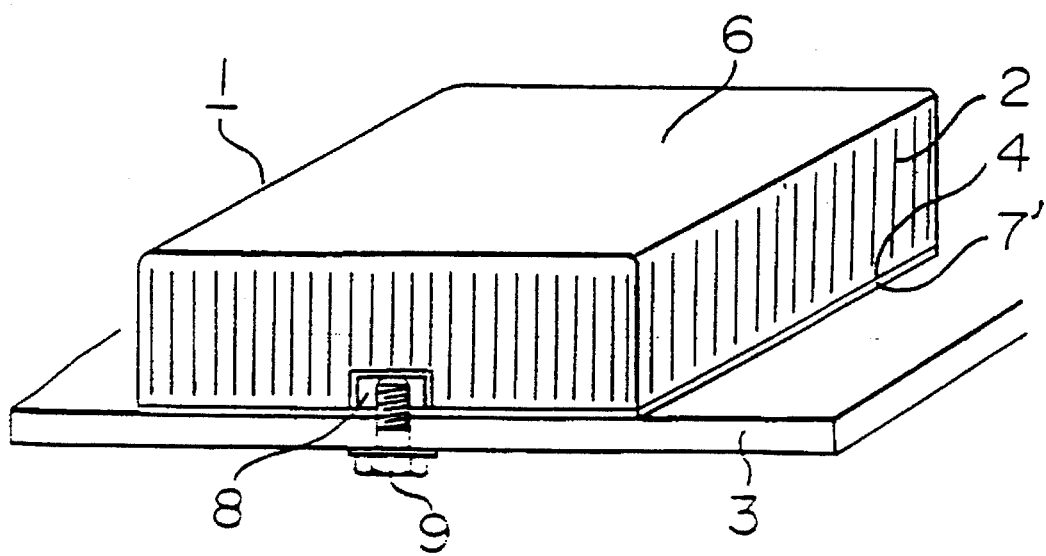

FIG. 2 illustrates a second embodiment of the first wall of the present invention. In this embodiment, the C/C composite material 2 obtained in Example 1 was used, and a thin metal plate 7' (pure Ti plate) was bonded to one side which is substantially perpendicular to the thickness direction.

Namely, on a pure Ti plate (melting point: 1,675° C.) 7 having a thickness of about 1 mm, a copper solder was placed, and the above C/C composite material was placed thereon. A weight of about 1 kg was placed thereon. In a vacuum furnace, the temperature was raised over a period of 1 hour and maintained at about 1,050° C. for 5 hours to obtain a C/C composite material having Ti bonded thereto with the solder portion 4 interposed therebetween.

Then, the thin metal plate 7 of this C/C composite material was mechanically connected to the substrate 3 by e.g. a bolt. Reference numeral 8 indicates a fixing plate, and numeral 9 indicates a connector. The substrate 3 may be provided with cooling tubes as in the first embodiment. Reference numeral 6 indicates the plasma-facing side.

Figure 3:
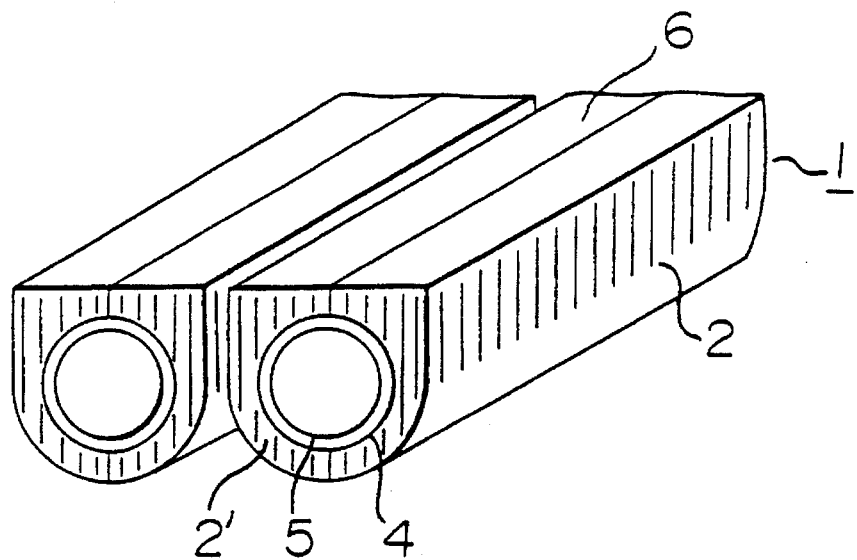
Figure 4:
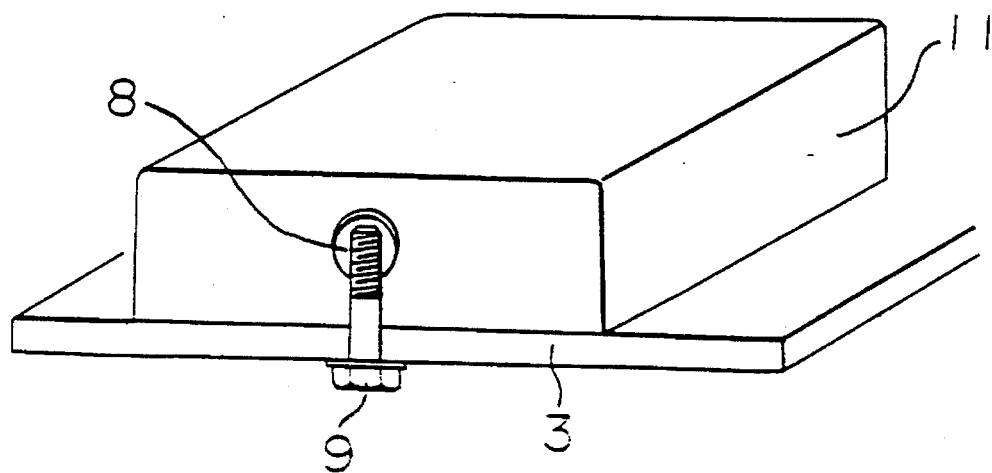
FIG. 4 is perspective view illustrating the conventional first wall.

FIG. 3 illustrates a third embodiment of the first wall of the present invention. In this embodiment, the C/C composite materials 2 and 2' are bonded around a cooling tube 5 with a solder portion 4 interposed therebetween. The plasma-facing side is disposed to face the plasma of the nuclear fusion reactor. Thus, the composite materials of the present invention are used as the first wall.

EXAMPLE 17

A C/C composite material having a metal bonded thereto was prepared in the same manner as in Example 16 except that in the first embodiment of Example 16, the C/C composite material obtained in Example 3 was used, and a Mo plate having a thickness of 2 mm was used as the material for interposition. It was used as the first wall.

Further, a C/C composite material for the first wall was prepared in the same manner as in Example 16 except that in the second embodiment of Example 16, the C/C composite material obtained in Example 3 was bonded to a Mo plate (melting point: about 2,620° C.) having a thickness of 2 mm to obtain a C/C composite material having Mo bonded thereto.

The C/C composite material of the present invention has large heat conductivity and electrical conductivity in the thickness direction and thus is useful for application where heat or electrical conductivity in one direction is required.

For example, it is useful as a material for a heat exchanger whereby heat removal or heat conduction is carried out by contacting one flat surface with a cooling jacket, or as a material for a switch.

Further, the first wall made of the C/C composite material of the present invention has particularly excellent properties as the first wall, since the surface temperature, the vapor pressure and the sublimation loss are maintained at low levels even when exposed to a high heat load for a long period of time.

We claim:

1. A carbon fiber-reinforced carbon matrix composite sheet or plate which is positioned to extend, in its thickness direction, between a high temperature region and a low temperature region, said composite sheet or plate consisting essentially of:

pitch-based carbon fibers, wherein at least about 50% of said fibers are oriented substantially in the thickness direction, wherein the ratio of the thermal conductivity in the thickness direction to the thermal conductivity in a direction perpendicular to the thickness direction is at least 1.2, and the thermal conductivity in thickness direction is at least 1.5 W/cm.° C.

2. The composite sheet or plate of claim 1, wherein said composite sheet or plate is prepared by a process comprising the steps of:

(1) impregnating carbon fibers with a thermal setting resin to obtain impregnated carbon fibers;

(2) heating said impregnated carbon fibers to obtain a fiber/resin composite;

(3) cutting said fiber-resin composite to produce pieces having a predetermined fiber length and aligning the composite pieces so that the fibers are aligned substantially parallel to one another;

(4) exerting pressure to the aligned composite pieces in a direction perpendicular to the aligned fibers to form a pressed composite;

(5) molding and carbonizing said pressed composite to form a carbonized product;

(6) impregnating the carbonized product with pitch or a thermosetting resin to form an impregnated product and then carbonizing said impregnated product; and (7) graphitizing said carbon product at a temperature of at least 2,500° C. to form said composite sheet or plate.

3. The composite sheet or plate of claim 2 wherein heating step (2) is conducted at a temperature of from 50°–300° C. for from 0.2–5 hours.

4. The composite sheet or plate of claim 3, wherein graphitizing step (7) is conducted at a temperature of at least 2800° C.

* * * * *

UNITED STATES PATENT AND TRADEMARK OFFICE
CERTIFICATE OF CORRECTION

PATENT NO.  : 5,586,152
DATED       : Dec. 17, 1996
INVENTOR(S) : Kimihiro IOKI, et al.

It is certified that error appears in the above-indentified patent and that said Letters Patent is hereby corrected as shown below:

On the title page, Item [60], the Related U.S. Application Data, should read:

--Continuation of Ser. No. 286,184, Aug. 5, 1994, abandoned, which is a division of Ser. No. 873,683, Apr. 24, 1992, Pat. No. 5,390,217, which is a continuation of Ser. No. 343,374, Apr. 26, 1989, abandoned.--

Signed and Sealed this

Twenty-fifth Day of March, 1997

Attest:

BRUCE LEHMAN

Attesting Officer

Commissioner of Patents and Trademarks